United States Patent Office 2,809,792
Patented Oct. 15, 1957

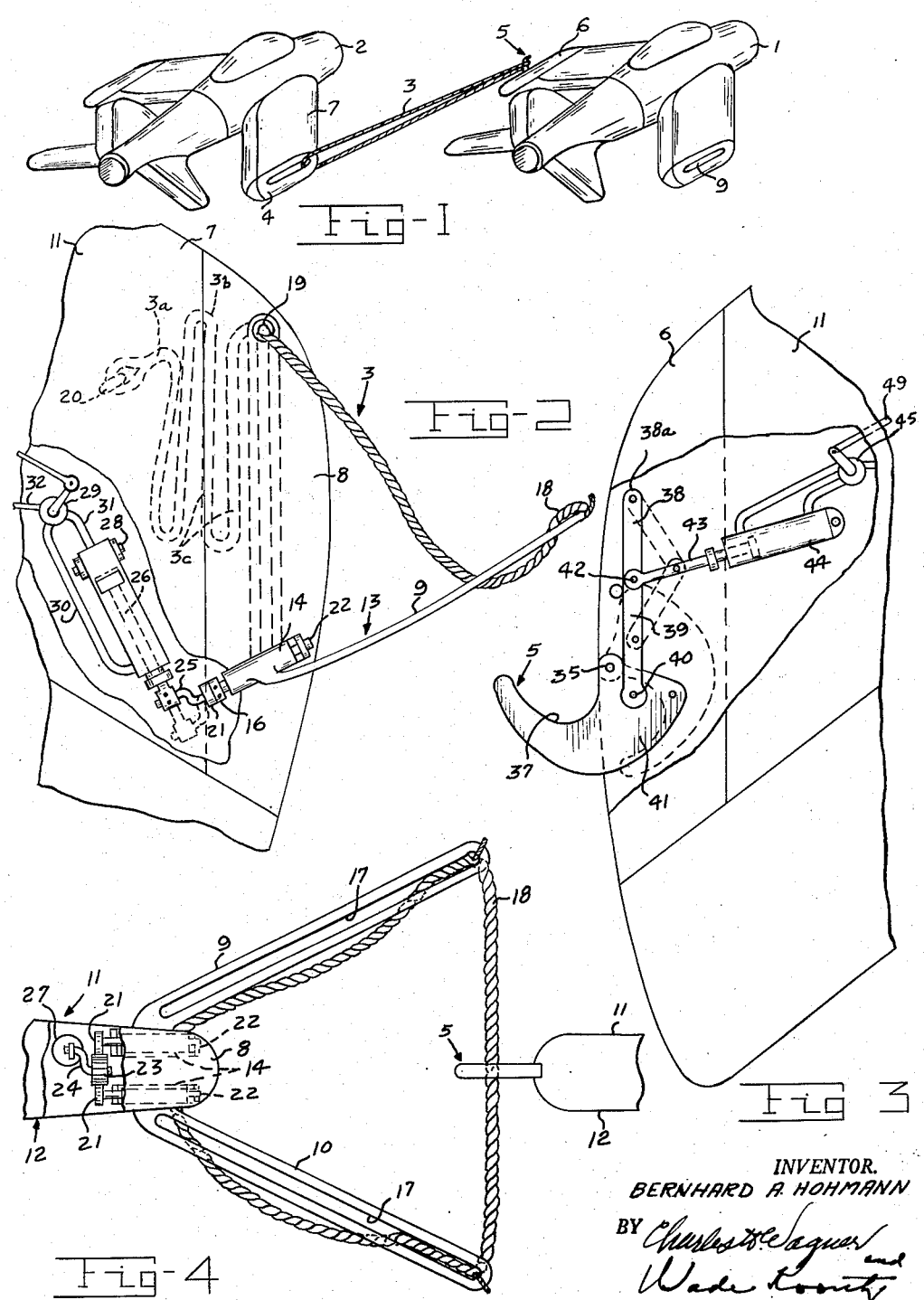

2,809,792

COUPLING APPARATUS FOR FIGHTER AIRCRAFT

Bernhard A. Hohmann, Fairborn, Ohio

Application May 23, 1955, Serial No. 510,590

14 Claims. (Cl. 244—3)

(Granted under Title 35, U. S. Code (1952), sec. 266)

The invention described herein may be manufactured and used by or for the United States Government for governmental purposes without payment to me of any royalty thereon.

This invention relates to an improved aircraft coupling method and apparatus for establishing a coupling connection between two aircrafts while in flight, whereby one aircraft can tow the other, and more particularly to means and apparatus carried by the aircraft at their opposite wing tips whereby the coupling and towing operation is made between the opposite wing tips of the two aircraft.

The invention contemplates primarily means in the form of an emergency coupling device or apparatus for jet aircraft, particularly fighters, whereby an aircraft in trouble because of fuel shortage, engine failure or damage, can be connected by a comparatively short flexible, normally retracted coupling member at, or on its wing tip to the adjacent wing tip of another fighter or similar aircraft by a normally retracted coupling member or hook at its opposite wing tip so as to tow the aircraft in trouble by its wing tip from the opposite wing tip of the other or towing aircraft.

When a squadron of jet fighter aircraft are on an operational mission and each is equipped with apparatus incorporating the invention and any one of the aircraft runs into mechanical or other "difficulties" and cannot conveniently land because of inaccessible or dangerous landing areas or conditions, and might otherwise be severely damaged, lost, or fall into enemy hands with the potential loss of skilled personnel and/or the aircraft, my improved rescue apparatus provides a convenient and inexpensive means whereby a flexible loop member carried by one of the aircraft (to be towed) in partly retracted position in one of its wing tips can be extended to form a tow loop, preferably held in spread condition by retractable means in a substantially vertical plane extending transversely to the longitudinal axis of the aircraft beyond its wing tip and one of the accompanying fighter jet aircraft having a retractable pickup loop connecting means hook member projecting laterally from its opposite wing tip to the wing tip of the other (disabled or partly disabled) aircraft having the pickup loop extended therefrom, in which the opening of the pickup hook is located in a substantially horizontal plane, extending from its wing tip, can easily fly, even in rough air, past the (other) aircraft to engage its pickup with the loop to withdraw the balance of loop from the wing tip and establish a satisfactory flexible towing relation between the wing tips of the two aircrafts with the towing aircraft slightly in advance of the towed aircraft. It has been found that an aircraft can be towed by its wing tip from another aircraft without much difficulty.

Another object is the provision of means whereby the towing connection can be released when desired, so that the towed aircraft will be released for landing at any proper time or should the damage be repaired sufficiently while in flight by its crew to enable it to proceed under its own power.

Another object is the provision of novel spreader means for the towing loop which is normally disposed substantially flush or in juxtaposed relation to the wing surfaces but can be spread and moved laterally at any time to dispose the pickup loop off of the end of the wing tip in a vertical plane, where air turbulance is at a minimum.

A further object is a wing tip towing arrangement whereby a large long range, towing craft can tow or couple, a smaller, shorter range, fast aircraft, such as a jet fighter (or fighters) by its wing tip to a distant area of operation, thereby conserving its fuel, whereby the fighter will have sufficient fuel to carry out its operational function and may then recouple and be towed back to its base and released, thus materially extending the operational field of fast jet aircraft without the necessity of the now conventional wing tip tanks, thus enabling the fighter to carry more defensive equipment or provide for greater maneuverability and speed.

Other objects and advantages of the invention will become apparent from the following description and accompanying drawings in which like reference numerals refer to like parts in the several figures.

*Drawings*

Figure 1 is a perspective view somewhat diagrammatically illustrating my invention in operational use, in which a fighter airplane is being towed by a second similar fighter airplane.

Figures 2 and 3 illustrate the adjacent wing tips of a pair of fighter aircraft, such as shown in Figure 1 and disposed in operative flight position, employing my improved coupling means, just prior to coupling, Figure 2 being a fragmentary plan view of the wing tip showing the loop spreader in operative position in full lines, and in inoperative position in dotted lines, parts being broken away to show the interior and one form of actuating means for extending and retracting the loop spreading arms. Figure 3 is a fragmentary plan view of the opposite wing tip of the towing aircraft, showing the pickup hook in operative position in full line, and in retracted, non-operative, position in dotted lines, parts being broken away to show the interior and one type of means for locking the hook in extended position, and for retracting the hook into the end of the wing tip.

Figure 4 is a fragmentary rear view of the adjacent wing tips of the towed and towing aircraft shown in Figures 2 and 3, illustrating the loop holding arms and towing loop in position with the hook extended in position for the pickup.

Referring to Figure 1 the reference numeral 1, indicates a fighter airplane towing a second fighter airplane 2, by a flexible towing connection in the form of a loop 3, connected at one end to the wing tip portion 4, of the towed plane 2, and engaged at its loop end by a towing hook 5, carried on the opposite wing tip portion 6, of the towing plane 1. These fighter aircrafts 1 and 2 may each be equipped with similar complemental components of the towing equipment on their opposite wing tip portion such as, for instance, a towing hook on the left wing tip of the towed plane 2 and a towing loop and spreader means on the right wing tip of the towing airplane, thus providing a towing arrangement whereby any similarly equipped aircraft can tow or be towed by each other, should the necessity arise.

Referring now to Figures 2 and 4 showing the towing loop and loop spreader means, the reference numeral 3, as before indicated, denotes the towing loop generally and 7, its right or starboard wing section, the outer or wing tip portion 8, thereof, being provided with a pair of loop spreading arms 9 and 10. These upper and lower arms 9 and 10 are similarly hinged to the wing tip section 8 at the top and bottom surfaces 11 and 12 thereof and have a flat camber or curvature similar to the contour respectively of the upper and lower surfaces 11 and 12, cordwise thereof, when the arms are swung to their inoperative position against the respective wing surfaces and preferably seated in receiving channels in the wing tip surfaces to provide a flush or streamline outer contour.

Suitable means for extending and retracting the arms simultaneously is also provided. Since the arms and extending means are preferably similar, only one of them will be described in detail, that being the upper one.

The upper arm 9 is provided with a hub portion 14 hinged on an axis or shaft 15 in suitable brackets 16 disposed at the desired angle to the wing cord, somewhat as shown, to dispose the arm 9 at the desired upwardly and forwardly inclined angle when in operative position as shown in full lines in Figures 2 and 4 and to effect the swinging movement into the receiving channels 16 in the wing tip upper (and lower) surfaces, extending in the flight direction of the aircraft. The mounting could also be arranged so that the arms would fold flat on top of the wing surfaces, if desired, however, the recessed and flush arrangement is preferable.

The arms are preferably slotted longitudinally as indicated at 17 to receive the end portion 18 of the towing loop end 3, to maintain its spread until pulled out of the slot by the hook 5 of the pickup or towing aircraft 1.

This arrangement is also subject to many modifications within the purview of the invention as set forth in the claims, for instance, the loop end 18 may be retained loosely in the slots 17 or retained in a depression in the forward or inner surface of each of the arms 9 and 10 by suitable light break cords (not shown) such that when the hook 5 picks up and withdraws the balance the towing loop from the wing tip the break cords give way, permitting the loop to disengage the arms as it is withdrawn by the hook 5 and extended to its limit.

The towing loop is preferably a flexible "nylon" tow line of suitable strength for towing purposes and looped at its middle portion with its free ends 3a and 3b passed through suitable eyelet openings 19 in the forward ends of the channels 16. The towing loop is comparatively short, for instance, about from 12 to 30 feet (although it could be somewhat longer if desired) and is dead-ended to suitable anchoring means 20, fastened within the wing cavity, somewhat as shown. The slack portion 3c between the arms 9 and 10 and the anchoring means 30 is pushed through the openings 19 and carefully stowed within the wing cavity so that when the loop is picked up and pulled by the towing aircraft the loop 3 will be withdrawn through the thimble 19, without tangling or snagging, to its extended position as shown in Figure 1, establishing the towing connection to the anchoring means 30.

As indicated previously some suitable actuating means is provided for holding the arms 9 and 10 in their retracted or inoperative positions and for extending the arms and the loop portion 18 releasably attached to the arms to the operative or pickup position and retracting them.

While any suitable actuating means may be employed, one form is illustrated for exemplary rather than restrictive purposes, comprise a pinion member 21 fixed to a pivot shaft 22 of the hub portion 14 of each of the arms 9 and 10. Since the hub portions 14 of both arms 9 and 10 are parallel to and directly opposite each other in spaced relation it is only necessary to provide an intermediate pinion 23 meshing at its opposite sides with the pinions 21 which are fixed on the hub portions 14, this intermediate pinion being suitably fixed on a stub shaft 24 journalled in suitable bearings for rotation, the end of the shaft 24 being formed with a crank arm or member 25 which is connected to a piston rod with a hydraulic cylinder 27, pivoted at 28, to the wing structure, valve means 29 controlling pressure fluid through conduits 30 and 31, the valve being shifted to admit pressure fluid from the supply conduit 32 to either end of the cylinder by the shifter rod 33 operated "inboard" under control of the pilot. An exhaust or return fluid conduit for the pressure fluid should be provided. When valve 29 is shifted by the pilot to one position as shown the pressure fluid enters the piston rod receiving end of the cylinder, moving the piston and rod to the pivot end of the cylinder, rotating the pinion 23 to simultaneously rotate the pinions 21 and arms 9 and 10 to one of their positions, for instance, the operative position shown in full lines in Figures 2 and 4.

When the valve 29 is in its other position, (which is its normal position) pressure is admitted to the pivot end of the cylinder 27 holding the arms 9 and 10 in retracted position flush with the wing surfaces.

In the combination, the opposite wing tip is preferably provided with the hook 5 and the extending and retracting means. Since a towing procedure or system requires two planes, the left wing tip of the towing aircraft is depicted at 6 in Figures 3 and 4 with the hook 5 shown extended in full lines and retracted in dotted lines.

More specifically the hook 5 is pivoted on a substantially vertical pivot or axis 35 for swinging movements into and out of a suitable slot or aperture in the outer edge of the wing tip section of the left wing of the (towing) aircraft.

The "bight" of the hook is indicated at 37 being sufficiently deep and shaped to retain the loop portion 18 from easily sliding off once it is engaged.

Any suitable retracting and extending means may also be used for holding the hook retracted as shown in dotted lines in Figure 3, and for extending the hook to its operative or "pickup" position as shown in full lines and locking it in said extended or towing position.

For exemplary, rather than invention limiting purposes, one simplified form of hook actuating means is illustrated and described as follows, it being understood that other hook actuating means are contemplated within the scope of the appended claims.

As shown in Figure 3, a pair of toggle links 38 and 39 are provided, the front link 38 being pivoted at 38a to the wing tip structure while the rear end of the link 39 is pivoted at 40 to the shank or base portion 41 of the hook 5. The links 38 and 39 are, of course, pivoted together at 42 and a piston rod 43 is connected to this latter pivot 42, the piston rod extending thru a suitable packing gland into a hydraulic cylinder 44 and carrying a piston.

The opposite ends of the cylinder 44 are connected to a 3 (or 4) way control valve 45 by pressure conduits 46 and 47, a pressure fluid being supplied to the valve 45 by a supply conduit 48 (a return conduit for the exhaust fluid may be provided if desired). The valve 45, like the valve 29, is actuated from "inboard" by the pilot through a suitable valve control rod 49. The hook member 5 is normally maintained retracted with the toggle held "broken" by pressure applied in the outer end of the cylinder 44. When the valve 45 is shifted to apply pressure to the inner end of the cylinder 44 the piston and piston rod move the toggle links to project the hook 5 to the position shown in full lines and "erect" the toggle to dead-center position as shown, thus locking the hook in towing position against collapsing under the towed load.

When it is desired to release the tow the valve 45 is shifted to collapse the toggle and the load or pull of the tow loop assists in returning the hook and freeing the tow from the towing aircraft.

The front end of the cylinder 44 is pivoted at 50 to the interior of the wing structure to provide for swinging movement of the link 38 from the pivot 38a without flexing the rod 43.

One form of the invention is shown and described for exemplary purposes, rather than in a limiting sense and it is therefore understood that the invention is subject to various modifications and changes which come with the scope of the appended claims and are in purview of one skilled in the art to which the invention appertains.

I claim:

1. In combination, a towing airplane and an airplane to be towed, said airplanes each having a fuselage, and supporting wings projecting transversely from the opposite sides of the fuselage, terminating in wing tips, a flexible towing loop connected to the wing tip of one of said airplanes, means carried by the wing tip portion of the last mentioned airplane to spread the loop outwardly beyond said wing tip and a loop pickup hook member projecting from the opposite wing tip of the other of said airplanes for hooking engagement with the towing loop in flight to establish a flexible towing loop and hook connection between the opposite wing tips of the two airplanes.

2. Apparatus as claimed in claim 1, in which the loop spreading means is fixed on the wing tip of the airplane and is engageable with said flexible towing loop for holding the towing loop spread in a substantially vertical plane off the end of the wing tip, transversely to the direction of flight of said airplane.

3. Apparatus as claimed in claim 2, in which said flexible towing loop is provided with end portions initially retained within the wing tip and partially withdrawable therefrom when engaged and tensioned by the loop pickup hook member, and anchoring means in said wing tip engaging said end portions to prevent more than a predetermined length of the ends of the loop from being withdrawn from the wing tip.

4. Apparatus as claimed in claim 3, in which the loop spreading means is adjustably carried by the airplane having the towing loop thereon for normally engaging said towing loop, and means holding said loop-spreading means and the end portion of the loop in an inoperative position in juxtaposed relation to the surface of the wing and for moving the spreading means outwardly away from the wing surfaces and wing tip to an operative position to spread the pickup loop, vertically, beyond the end of the wing tip.

5. Apparatus as claimed in claim 4, including a hook member which projects outward beyond the outer edge of the opposite wing tip of said airplane from the wing tip having the pickup loop and loop spreading means thereon, said hook member having a hook opening disposed in a substantially horizontal plane facing in a direction for engaging the pickup loop when the airplane to be towed passes the towing airplane, wing tip to wing tip.

6. Apparatus as claimed in claim 5, in which said hook member is pivoted in the wing tip for swinging movement beyond the end thereof in a substantially horizontal plane, and includes releasable means for rigidly retaining the hook member extended beyond the end of the wing tip in said horizontal plane and for retraction thereof into the wing tip.

7. In a wing tip to wing tip airplane towing combination, two airplanes, an elongated flexible towing loop connected to the tip end of one of the airplanes for towing connection to the opposite wing tip of the other airplane, means carried by said one of the airplanes for engaging and spreading said towing loop in a substantially vertical plane substantially transverse to the flight direction of said airplanes, off of the outer end of that airplane's wing tip, means anchoring the ends of the loop inside of the wing tip of said one of the airplanes, a retractable hook member fixed to the opposite wing tip of the other airplane extending beyond the outer end of said opposite wing tip in a substantially horizontal plane, off the end of the said opposite wing tip.

8. In an aircraft wing tip to wing tip towing combination, a pair of airplanes each having a fuselage and wings projecting from the opposite sides of the fuselage terminating in wing tips, said airplanes each having an elongated flexible pickup towing loop anchored in one wing tip thereof on the same ends of the wings and extensible to form a towing loop connected to that wing tip, loop spreading and holding means pivotally carried by that wing tip and engaging said loop for spreading said loop in a substantially vertical plane spanwise beyond the end of that wing tip, a hook member carried by the other wing tip of each airplane having a hook portion extended spanwise beyond the end of said other wing tips with a hook opening extending in the flight direction of that airplane in a substantially horizontal plane to receive and engage the extended towing loop of the other airplane for towing, whereby either of said airplanes can tow the other from their opposite wing tip by spreading said towing loop on one of said airplanes in said vertical plane and extending said hook portion on the other airplane in said horizontal plane and flying one of said airplanes past the other with the wing tips thereof having towing loop and hook members thereon adjacent each other in substantially the same horizontal plane to establish a towing engagement between the loop and hook members.

9. An improved towing means for establishing a flexible towing connection between two jet airplanes which comprises an elongated flexible towing loop, securing means for said towing loop on one of the air planes at one wing tip end thereof, towing loop spreading means carried by said one airplane adjacent said wing tip for spreading engagement with said loop for spreading the same in a vertical plane transversely to the direction of flight of said one airplane outwardly beyond the end of said wing tip, for the reception and engagement thereof with a horizontal towing hook member projecting outwardly from the opposite wing tip of the second airplane, to establish a flexible elongated towing loop connection between the wing tips of said airplanes.

10. Apparatus as claimed in claim 9, in which the towing loop spreading means comprises a pair of substantially rigid loop spreading arms pivotally connected to the wing tip portion of said one airplane at the upper and lower surfaces thereof and swingable vertically between inoperative positions in juxtaposed relation to said surfaces and loop spreading positions including spanwise away from said surfaces outwardly beyond the wing tip ends with their outer extremities spaced apart in a substantially vertical plane beyond the end of the wing tip, respectively above and below the upper and lower surfaces of the wing tip, and means for selectively moving said spreading means to said two positions.

11. Apparatus as claimed in claim 10, in which the elongated towing loop is partially stowed within the wing tip portion and is connected at each side of its loop end to the outer extremities of said arms, whereby to dispose the loop end portion spread in a vertical plane between said extremities, said towing loop being dead-end connected to said one airplane within said wing tip portion and partially contained within said wing tip portion out of the air stream and partially withdrawable from said wing tip portion to form the elongated flexible towing loop when engaged and tensioned by the pickup hook projecting on the opposite wing tip of the other airplane.

12. Apparatus as claimed in claim 11, in which the towing loop and spreader means are mounted on the airplane to be towed, and the pickup hook is mounted on the towing aircraft, said pickup hook comprises a rotatable plate pivoted within the wing tip structure of the towing airplane between the upper and lower surfaces thereof and formed with a hook portion facing forwardly and rotatable horizontally into the wing tip portion and outwardly beyond the outer extremity of the wing tip portion to a projected loop pickup position by rotation of said plate in opposite directions, and means within the wing tip portion for releasably locking said hook portion in its projected position, whereby, when the towing plane is flown past the plane to be towed with their opposite wing tips adjacent each other in edge to edge relation in substantially the same plane, the hook portion will engage and tension the towing loop between the extremities of the spreader arms to withdraw and extend the stowed portion of the towing loop contained in the wing portion to establish an elongated wing tip to wing tip flexible towing connection between the towing and towed airplanes.

13. Apparatus as claimed in claim 12, including means for releasing the rotatable plate for rotation to retract the hook portion and disengage said towing loop to release the towing airplane from the airplane being towed.

14. Apparatus as set forth in claim 13, including remote control means connected to said loop spreader arms for moving said spreader arms to said loop spreading position and for retaining the spreader arms in their non-spread positions adjacent the upper and lower surfaces of the wing tip.

References Cited in the file of this patent
UNITED STATES PATENTS

| | | |
|---|---|---|
| 2,193,312 | Cobham et al. | Mar. 12, 1940 |
| 2,376,994 | Fenton | May 29, 1945 |
| 2,443,308 | Doolittle | June 15, 1948 |
| 2,692,102 | Cobham et al. | Oct. 19, 1954 |